United States Patent [19]
Gries

[11] Patent Number: 4,659,483
[45] Date of Patent: Apr. 21, 1987

[54] METHOD OF AND A MEANS FOR FEEDING MATERIAL TO A FILTERING APPARATUS

[75] Inventor: Willi Gries, Rodgau, Fed. Rep. of Germany

[73] Assignee: Netzsch-Mohnopumpen GmbH, Waldkraiburg, Fed. Rep. of Germany

[21] Appl. No.: 741,791

[22] Filed: Jun. 6, 1985

[30] Foreign Application Priority Data

Jul. 18, 1984 [DE] Fed. Rep. of Germany ....... 3426523

[51] Int. Cl.⁴ .......................... C02F 1/52; B01D 25/12
[52] U.S. Cl. .................................... 210/709; 210/741; 210/90; 210/96.1; 210/224
[58] Field of Search ............... 210/709, 741, 204, 224, 210/96.1, 90

[56] References Cited

U.S. PATENT DOCUMENTS

| | | | |
|---|---|---|---|
| 4,151,080 | 4/1979 | Zuckerman et al. | 210/96.1 |
| 4,159,248 | 6/1979 | Taylor et al. | 210/96.1 |
| 4,198,298 | 4/1980 | Zuckerman et al. | 210/96.1 |
| 4,370,232 | 1/1983 | Busse et al. | 210/741 |
| 4,427,552 | 1/1984 | Lieberherr et al. | 210/741 |
| 4,439,325 | 3/1984 | Blais | 210/224 |
| 4,544,489 | 10/1985 | Campbell et al. | 210/709 |

FOREIGN PATENT DOCUMENTS

| | | |
|---|---|---|
| 1760227 | 1/1958 | Fed. Rep. of Germany. |
| 1461443 | 3/1969 | Fed. Rep. of Germany. |
| 1461452 | 5/1970 | Fed. Rep. of Germany. |
| 1528555 | 7/1971 | Fed. Rep. of Germany. |
| 2244917 | 3/1974 | Fed. Rep. of Germany. |
| 2353874 | 5/1974 | Fed. Rep. of Germany ...... 210/224 |
| 2530550 | 1/1977 | Fed. Rep. of Germany. |
| 2548842 | 5/1977 | Fed. Rep. of Germany. |
| 2805204 | 8/1979 | Fed. Rep. of Germany. |
| 3126801 | 1/1983 | Fed. Rep. of Germany. |
| 58-36608 | 7/1979 | Japan .................................. 210/224 |
| 59-59229 | 4/1984 | Japan .................................. 210/224 |

*Primary Examiner*—Benoit Castel
*Attorney, Agent, or Firm*—Browdy and Neimark

[57] ABSTRACT

A filter press (10) is supplied with material to be filtered by a filling pump (20) and a high pressure pump (26). Both pumps are connected in parallel and designed as eccentric worm pumps. The charging pressure is gradually raised to a final pressure without any temporary dropping so as to reduce the charging time to a minimum. In correspondence with the gradually decreasing absorption capacity of the filter press (10) first the normal speed of the filling pump (20) is lowered to a predetermined lower operating speed at unvarying speed of the high pressure pump (26). If required, then also the speed of the high pressure pump (26) is reduced. If the absorption capacity of the filter press (10) again increases, first the speed of the high pressure pump (26) is raised again to its former value and, if necessary, subsequently the speed of the filling pump (20) is increased again. A control means (52) including a microprocessor unit serves to vary the speed of the pumps (20 or 26) by way of speed control means (36,38). The inputs into the control means (52) are electrical signals corresponding to scanned "values" of the charging pressure. Guide and control magnitudes can be entered freely into the microprocessor unit in response to the properties of the filtering apparatus and the material to be filtered.

8 Claims, 4 Drawing Figures

METHOD OF AND A MEANS FOR FEEDING MATERIAL TO A FILTERING APPARATUS

FIELD OF THE INVENTION

The invention relates to a method of feeding material to be filtered to a filtering apparatus, especially a filter press, wherein the charging pressure generated by a plurality of feed pumps is increased to a final pressure which is substantially maintained until the end of the filtration, while the quantity being fed per unit time decreases gradually, at least one filling pump and one high pressure pump connected in parallel cooperating at least for part of the charging time.

BACKGROUND OF THE INVENTION

With a known method of this kind (Technische Information NM 142/01 (Technical Information) by Messrs. Netzsch-Mohnopumpen GmbH, D-8264 Waldkraiburg) the speed of the filling pump and thus the quantity being fed is reduced in steps when a predetermined filtration pressure has been reached. When a predetermined minimum speed has been reached, the filling pump is turned off by an end switch. After turn off of the filling pump only the high pressure pump remains in operation for the remainder of the charging time, and it increases the charging pressure to the final pressure. As there is no harmonized utilization of the performances of the two pumps connected in parallel, the charging time is long and, therefore, the operating costs are high.

Likewise known is a method of feeding material to a filtering apparatus by means of a feed pump (EP-A-No. 0 027 910) with which the feeding is effected in repeated press cycles during the course of which the feed pump is operating which is rendered idle upon reaching of a predetermined limit value of the pressure in the respective feeding or charging phase until the feeding or charging pressure has again dropped to a lower limit value. The operating behaviour is uneconomical as the feed pump is being switched on and off.

SUMMARY OF THE INVENTION

It is an object of the invention to feed material to a filtering apparatus, especially a filter press in such manner that the feeding or charging period is as short as possible and feed pumps are used economically.

This object is met, in accordance with the invention, in that the gradual decrease of the quantity being fed per unit time first is effected by lowering the normal speed of the filling pump to a given lower operating speed at constant speed of the high pressure pump, that upon reaching of the lower operating speed of the filling pump the speed of the high pressure pump is lowered for further reduction of the quantity being fed, that in case of a preliminary increase of the absorption capacity first the speed of the high pressure pump is again raised to its former value and, if required, subsequently the quantity being fed is increased further by increasing the speed of the filling pump, and that the filling pump is turned off when the absorption capacity has decreased so far that the high pressure pump is sufficient for feeding the filter press without its speed surpassing a predeterminable value.

In accordance with the invention the slow reduction of the quantity being fed per unit time at first is effected by lowering the speed of the filling pump to a given lower speed, while the speed of the high pressure pump remains unchanged. For this reason the high pressure pump can be operated at constant speed during the beginning of the charging process so that it may be designed for optimum efficiency in this range. The control of the rather great amount being fed per unit time at the beginning of the charging process by way of lowering the speed of the filling pump further results in quick control response whereby the increase of the charging pressure can be obtained in a manner to be exactly predetermined.

Furthermore, in accordance with the invention, the speed of the high pressure pump is lowered upon reaching of the lower speed of the filling pump so as to reduce the quantity being fed still further. As a consequence the filling pump is operated only within the speed range in which it operates economically. If an eccentric worm pump is used as the filling pump, therefore, unnecessary wear of the rotor and stator thereof is avoided which would otherwise occur even at low numbers of revolution.

In case of a temporary increase of the absorption capacity the invention provides for first raising the speed of the high pressure pump once more to its previous value and then, if required, increasing the quantity being fed by way of an increase of the speed of the filling pump. As a result, the quantity being fed can be controlled accurately and economically during this part of the charging period. The feeding capacity of the filling pump is continued to be used and it can be elevated at any time. However, at first the quantity being fed is increased only by way of the speed of the high pressure pump so as to realize a quickly responsive control.

In accordance with the invention the filling pump is switched off when the absorption capacity has decreased to such an extent that the high pressure pump is sufficient to feed the filter press without its speed surpassing a predetermined value. This means that the filling pump remains in operation until the quantity being fed can be controlled exclusively by changing the speed of the high pressure pump. In accordance with the invention two or more filling and high pressure pumps are operated in parallel for as long as may be required, based on the absorption capacity, for the purpose of economic filtration at a short charging time.

The control provided by the invention of the quantity being fed by the feed pumps by way of speed control thereof makes it possible to increase the charging pressure to a final pressure in such manner that the charging pressure cannot drop temporarily even without any pressure tanks being connected in between.

In accordance with a preferred embodiment an admixture of flocculation agents depending on the quantity being fed per unit time is controlled by measuring values of the speeds of the feed pumps. In this manner too high or too low a dose is avoided because the flocculation agents are being added in response to the dry substance of the material to be filtered by separation into solid and liquid portions.

With another preferred embodiment the final pressure is achieved in pressure steps comprising a plurality of given intervals of a predetermined constant pressure. In this manner the filter cake building up on the filter cloths is prevented from compacting too fast and, therefore, the filter cake permits better draining for having an improved porosity.

Especially well-suited to carry out the method according to the invention is a means comprising a plurality of eccentric worm pumps provided with speed control means. The latter may be embodied by mechanical control means or by frequency control assemblies for three-phase current drive motors. Such a means is developed further in accordance with the invention in that means are provided for inductively measuring the speeds and for measuring the charging pressure and that a microprocessor unit is provided which is adapted for the free input of control magnitudes for the gradual increase of the charging pressure, including intervals of constant pressure, the input magnitudes being scanned values of the charging pressure and of the pump speeds and the outputs thereof being adjustment values for the mechanical control means to govern the pump speeds.

The use according to the invention of a microprocessor unit into which guide figures can be entered freely so as to obtain a gradual increase of the charging pressure makes it possible to predetermine the charging in simple manner in dependence on the properties of the filtering apparatus, the feed pumps, and the material being fed.

The pressure can be monitored independently of the detection of the charging pressure for the microprocessor unit because a further development of the means according to the invention provides for a diaphragm pressure switch for checking the pressure.

In an advantageous embodiment of the means according to the invention a counting unit for completed filtration cycles is included in the microprocessor.

BRIEF DESCRIPTION OF THE DRAWING

The invention will be described below with reference to diagrammatic drawings, in which.

DETAILED DESCRIPTION OF THE PREFERRED EMBODIMENTS

Figure 1:
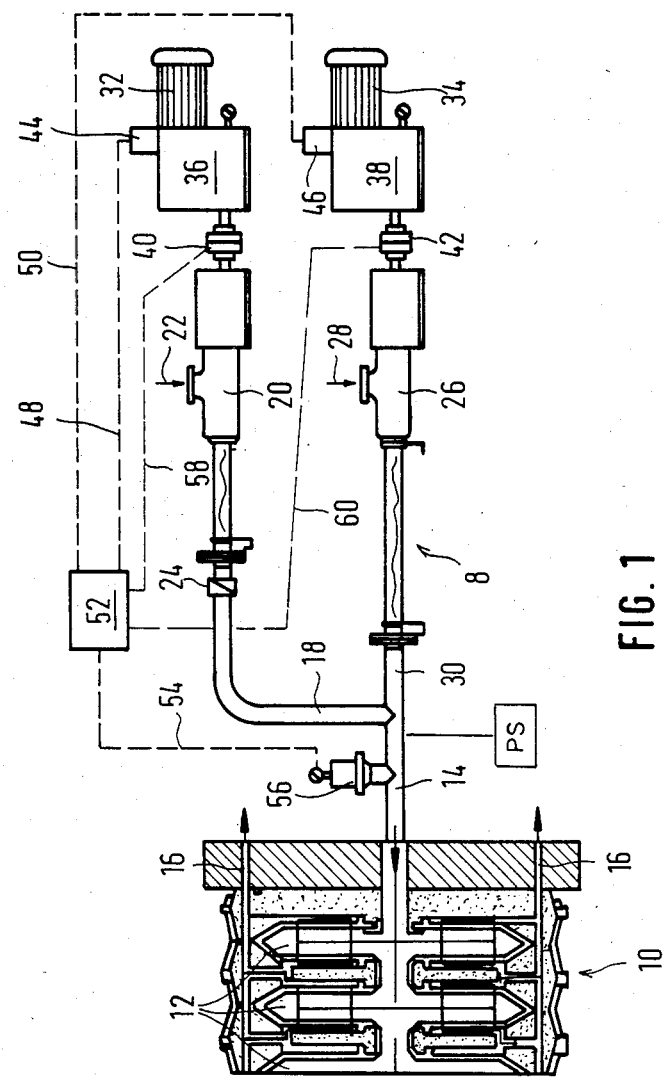
FIG. 1 is a flow diagram of a means according to the invention.

The flow diagram of FIG. 1 shows a means 8 for feeding material to an incompletely illustrated filter press 10 comprising filter chambers 12 which are lined with filter cloths. In the course of the filtration a filter cake deposits on the filter cloths. Material to be filtered is supplied to the filter press 10 through a supply conduit 14 in the direction of the arrow shown. Upon filtration the material may leave the filter chambers 12 through discharge conduits 16.

The supply conduit 14 is connected to a filling pump 20 which receives the material to be filtered through an inlet 22 in the direction of the arrow shown. The filling pump 20 is embodied by an eccentric worm pump and feeds the material to be filtered through a check flap 24 and a branch pipe 18 into the supply conduit 14 of the filter press 10. A high pressure pump 26 likewise embodied by an eccentric worm pump is connected in parallel with the filling pump 20 and receives material to be filtered through an inlet 28 in the direction of the arrow shown. The high pressure pump 26 leads the material to be filtered through a supply pipe 30 which joins the branch pipe 18 into the branch conduit 14 of the filter press. Both eccentric worm pumps 20, 26 are driven by drive motors 32, 34 by way of mechanical variable speed gearings 36, 38 the output shafts of which are connected by clutches 40, 42 to the drive shafts of the eccentric worm pumps 20, 26.

The mechanical variable speed gearings 36, 38 are operable by servo motors 44, 46 which receive control signals from a control unit 52 by way of control lines 48, 50. The control unit comprises a microprocessor unit which is adapted for the free input of the values required for control of the feeding or charging. Electrical signals of values to be detected by a pressure converter 56 of the charging pressure in the supply conduit 14 are applicable through an input line 54 to the control unit 52. Electrical signals of the pump speeds $n_F$, $n_H$ determined by inductive speed measuring means (not shown) on the clutches 40, 42 are applied through control lines 58, 60 to the microprocessor unit.

Figure 2:
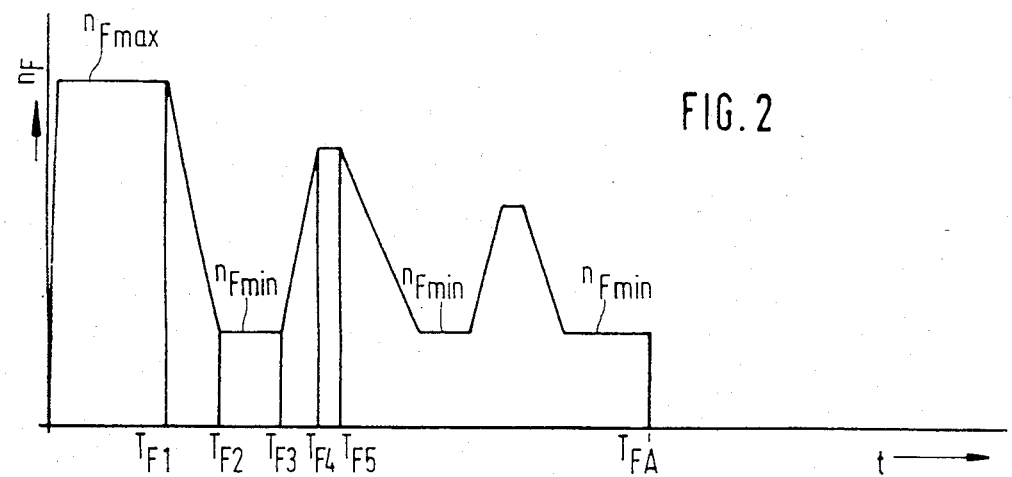
FIG. 2 shows the course of the filling pump speed above the charging time.
Figure 3:
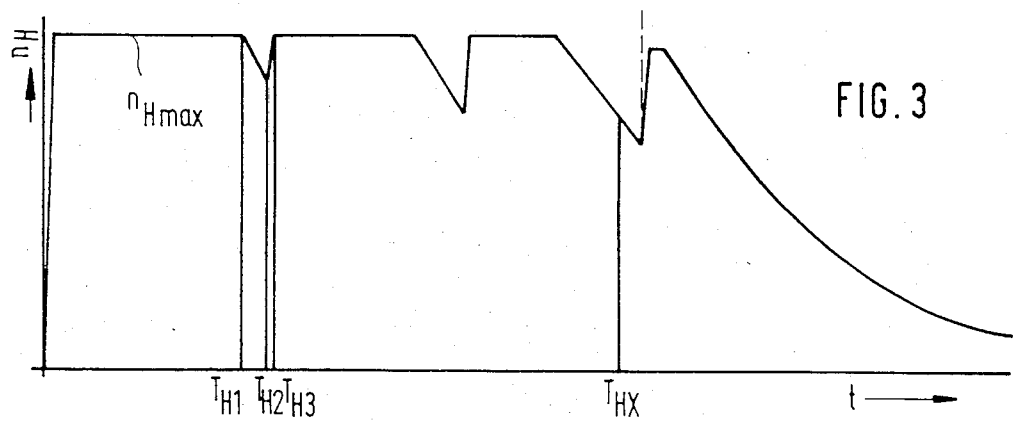
FIG. 3 shows the course of the high pressure pump speed above the charging time.
Figure 4:
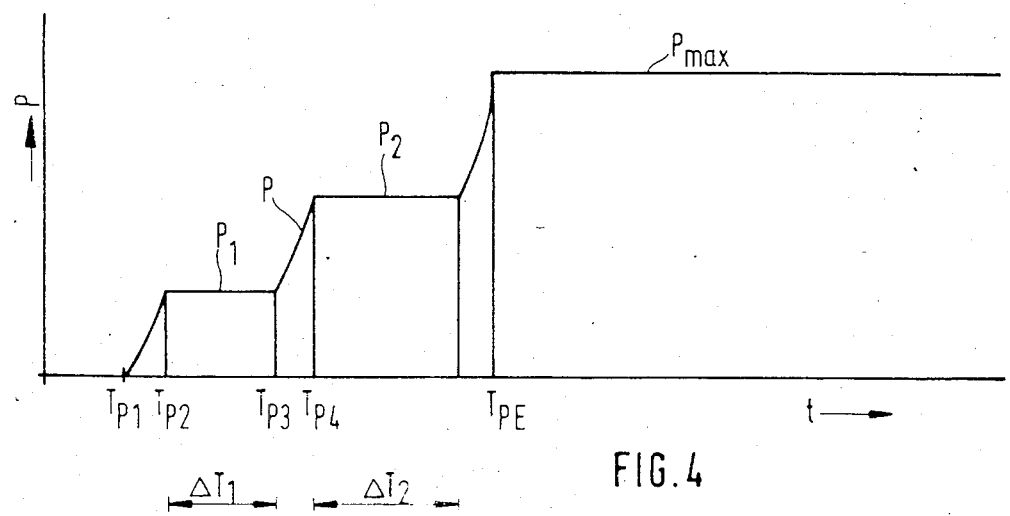
FIG. 4 shows the course of the filtration pressure above the charging time.

At the beginning of charging the filter press 10, the speed of the filling pump 20 is increased to a value $n_{Fmax}$ and the speed of the high pressure pump 26 is caused to assume a value $n_{Hmax}$, as shown in FIGS. 2 and 3. As indicated in FIG. 4, the feeding of material to be filtered at first is effected without pressure. As of a point in time $T_{P1}$ the charging pressure is increased gradually up to a predetermined value $P_1$ which is reached at time $T_{P2}$ in response to the property of the material being filtered and the resulting structure of the filter cake.

If a loose porous structure of the filter cake permeable to the filtrate is to be achieved, the filtration pressure building up and corresponding to the charging pressure in the supply conduit 14 must not rise voluntarily. The optimum pressure rise in the interest of a short charging period first may be obtained by reducing the speed $n_F$ of the filling pump 20, in consideration of the properties of the given filter press 10 and the predetermined material to be filtered. In the instant example it is assumed that the build-up of the filter cake upon reaching of the pressure $P_1$ has attained such a level that any further build-up caused by further rise in pressure would lead to an unnecessary reduction of the absorption capacity of the filter press 10 and consequently to the lengthening of the charging period. Beginning at time $T_{F1}$ which essentially corresponds to time $T_{P2}$, therefore, the speed $n_F$ of the filling pump 20 is reduced from its value $n_{Fmax}$ to its value $n_{Fmin}$ up to the time $T_{F2}$. The value $n_{Fmin}$ is fixed in dependence on the design of the eccentric worm pump used as the filling pump 20 such that this speed still permits economic operation and the speed still is high enough to avoid any unnecessary wear caused by too great an axial slipping between the rotor and the stator of the filling pump 20.

If the reduction of the filling pump speed to a value $n_{Fmin}$, as shown in the embodiment, is not sufficient in order to maintain the necessary constant pressure $P_1$ in the predetermined interval $\Delta T_1$ between times $T_{P2}$ and $T_{P3}$ so as to build up a uniform filter cake along the filter cloths, the additional measure is taken of reducing the speed $n_H$ of the high pressure pump 26, as is indicated in FIG. 3 between times $T_{H1}$ and $T_{F2}$.

The pressure rise beginning at time $T_{P3}$ and required to guarantee the minimum charging period, at first, is effected by again setting the speed of the high pressure pump 26 to its value $n_{Hmax}$ beginning at time $T_{H2}$ which corresponds to time $T_{P3}$. This is achieved at time $T_{H3}$ which corresponds to time $T_{F3}$. Beginning at this time the speed of the filling pump 20 is increased to a value which generally is smaller than the value $n_{Fmax}$, as shown in FIG. 2, and with which a pressure is reached at time $T_{P4}$, as shown in FIG. 4, which is followed once more by a predetermined interval $\Delta T_2$ of a given constant pressure $P_2$. The process described above is repeated until, as shown in FIG. 4, a pressure $P_{max}$ is reached at a time $T_{PE}$ which pressure is kept constant for the remainder of the charging period.

The structure of the filter cake increasing in thickness at the filter cloths results in the rise of the filtration pressure and charging pressure just like in the decrease of the absorption capacity. As may be gathered from FIGS. 2 and 3 the quantity being fed and being proportional to the pump speeds drops at rising charging pressure because the filter cake becomes greater and thus the absorption capacity becomes less. At a time $T_{FA}$ the filling pump 20 is switched off altogether because, as shown in FIG. 3, the high pressure pump 26 is sufficient for control of the quantity being fed at a time $T_{HX}$ which precedes the time $T_{FA}$. From time $T_{HX}$ on the high pressure pump is operated permanently below its maximum speed $n_{Hmax}$.

For the sake of clarity FIGS. 2 to 4 show a gradual rise in charging pressure P in three pressure steps. The control unit 52 makes it possible to obtain the gradual rise of the pressure to a value $P_{max}$ in a maximum number of ten pressure steps including given intervals of constant pressure because the control unit 52 permits the free input of control magnitudes relating to the pressure $P_1$, $P_2$, $P_{max}$. Electrical signals of values of the charging pressure P detected at intervals are applied by a pressure converter 56 through an input line 54 to the microprocessor unit of the control unit 52 to serve as inputs for the control. A comparison of these inputs with predeterminable desired magnitudes $P_1$, $P_2$, $P_{max}$ is made in the microprocessor unit and, in case of deviations beyond a certain predeterminable tolerance range, the control line 48 or 50 transmits an electrical output signal to the servo motor 44 or 46. The predetermined speed change of the filling pump 20 and/or the high pressure pump 26 is effected by the mechanical control means 36, 38.

If speed control of three-phase current drive motors is provided, corresponding electrical output signals of the microprocessor unit are applied to the same through the control lines 48, 50.

An inductive measuring means (not shown) on the clutches 40, 42 is adapted to measure the speeds of the filling pump 20 and of the high pressure pump 26. The measured values of the speeds $n_F$ and $n_H$ are transmitted through control lines 58, 60 thus being entered into the microprocessor unit so that the respective quantity being fed can be determined by way of the displacement volume of the two pumps 20, 26. In this manner it is possible to admix flocculation agents to the material being filtered in response to the quantity being fed per unit time. This will cause the formation of a uniform and porous filter cake which is in the interest of assuring the minimum charging period.

As a safety measure a diaphragm pressure switch PS is provided to monitor the pressure regardless of the values determined by the pressure converter 56.

The microprocessor unit of the control unit 52 may include a counting unit for completed filtration cycles. The values needed in a three-term controller of variable, adjustable control behaviour and relating to the control magnitude, the tolerance range or dead zone and an adjustable speed can be entered in per se known manner.

What is claimed is:

1. A method for feeding material to be filtered to a filter press (10) by means of at least one filling pump (20) and one high pressure pump (26) connected in parallel whereby the charging pressure generated by the pumps is increased to a final pressure which is substantially maintained until the end of the filtration, comprising the steps of:
    decreasing first gradually the quantity of material being fed per time unit by lowering the normal speed ($n_{Fmax}$) of the filling pump (20) to a given lower operating speed ($n_{Fmin}$) while maintaining constant speed ($n_{Hmax}$) of the high pressure pump (26);
    lowering, upon reaching said lower operating speed ($n_{Fmin}$) of the filling pump (20), the speed ($n_H$) of the high pressure pump (26) to further reduce the quantity of material being fed;
    raising again, when a preliminary increase of the absorption capacity of the filter press occurs, first the speed ($n_H$) of the high pressure pump (26) to its former value and increasing subsequently the quantity of material being fed by increasing the speed ($n_F$) of the filling pump (20); and
    turning off the filling pump (20) when the absorption capacity has decreased so far that the high pressure pump (26) (is sufficient for feeding the filter press (10) without its speed ($n_H$) surpassing a predetermined value ($n_{Hmax}$).

2. The method of feeding material to a filter press as claimed in claim 1, controlling an admixture of flocculation agents corresponding to the quantity being fed per unit time by the respective values of the speeds ($n_F$, $n_H$) of the feed pumps (20, 26).

3. The method as claimed in claim 2, whereby the final pressure ($P_{max}$) is reached in pressure steps comprising a plurality of predeterminable time-intervals ($\Delta T_1$, $\Delta T_2$) of a predeterminable constant pressure ($P_1$, $P_2$).

4. The method as claimed in claim 1, whereby the final pressure ($P_{max}$) is reached in pressure steps comprising a plurality of predeterminable time-intervals ($\Delta T_1$, $\Delta T_2$) of a predeterminable constant pressure ($P_1$, $P_2$).

5. An apparatus for feeding material to be filtered to a filter press (10) comprising:
    a plurality of eccentric worm pumps (20, 26) connected in parallel to a common supply conduit (14) of the filter press (10), said pumps being provided with speed control means (36, 38);
    first measuring means (56) for measuring the charging pressure of the filter press (10), and second measuring means for measuring the speeds ($n_F$, $n_H$) of the pumps; and
    control means (52) for receiving measured values of the charging pressure and the speeds of the pumps from said first and second measuring means, said control means comprising a microprocessor for receiving freely given control magnitudes ($P_1$, $P_2$, $P_{max}$) regarding pressure and regarding time-intervals ($\Delta T_1$, $\Delta T_2$) of constant pressure ($P_1$, $P_2$).

6. The apparatus as claimed in claim 5, further comprising a diaphragm pressure switch to monitor the pressure (P).

7. The apparatus as claimed in claim 6, further comprising a counting unit in the micro-processor unit for counting completed filtration cycles.

8. The apparatus as claimed in claim 5, further comprising a counting unit in the micro-processor unit for counting completed filtration cycles.

* * * * *